March 1, 1927.    G. N. JEPPSON ET AL    1,619,734
TERRAZZO TILE AND METHOD OF MAKING THE SAME
Filed June 13, 1923
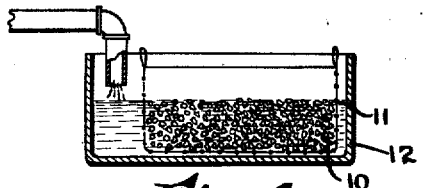
Fig. 1
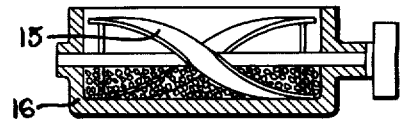
Fig. 2
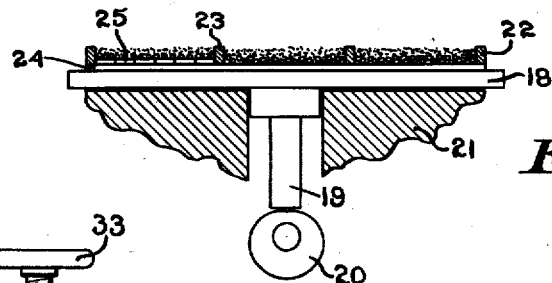
Fig. 3
Fig. 4
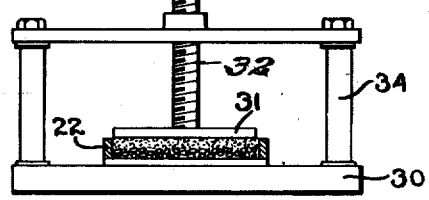
Fig. 5
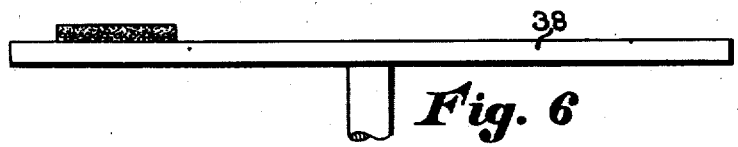
Fig. 6
Fig. 7
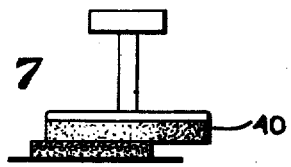
Fig. 8
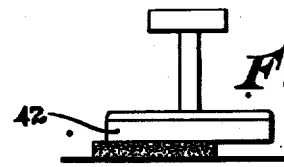
Fig. 9
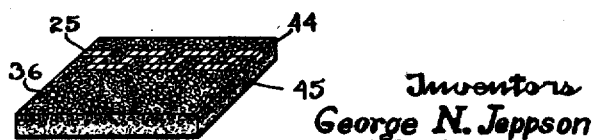
Witnesses
Harold W. Eaton
Leah A. Sessions
Inventors
George N. Jeppson
Carl L. Leafe
By Clayton R. Jenks
Attorney Patented Mar. 1, 1927.

1,619,734

UNITED STATES PATENT OFFICE.

GEORGE N. JEPPSON AND CARL L. LEAFE, OF WORCESTER, MASSACHUSETTS, ASSIGNORS TO NORTON COMPANY, OF WORCESTER, MASSACHUSETTS, A CORPORATION OF MASSACHUSETTS.

TERRAZZO TILE AND METHOD OF MAKING THE SAME.

Application filed June 13, 1923. Serial No. 645,183.

Our invention relates to cement-bonded articles for use as tread surfaces and the like and more particularly to a terrazzo tile and a method of making the same.

In the manufacture of terrazzo cement tread surfaces, the common method of making a floor is that of forming a plastic bed of cement and then rolling marble chips into the surface thereof. These chips are sprinkled on the top of the soft but partially set cement and are embedded therein by means of heavy rollers. The surface is then permitted to stand for a while until it can be inspected, after which further chips are sprinkled on the cement, particularly in vacant places, and the mass is again rolled. It is found that ordinarily new chips must be rolled into the cement three times before a uniform and satisfactory distribution of the terrazzo material can be obtained. This procedure has the serious disadvantage of producing a weak structure, since each time that chips are rolled into the partially set cement the mass is disturbed and the initial set of the cement is broken.

The common way of making a cement tile is to throw a mixture of chips and cement, wetted with water, into a mold and trowel over the surface, after which the mass is permitted to stand in the mold and harden. This method results in a block in which the chips seldom form more than half of the surface area and the tile does not present a dense compact structure. This type of surface wears away rapidly and "dusts" over with cement powder, thus taking on a dirty and unpleasing appearance.

Such types of flooring as heretofore constructed are not safe for pedestrians and especially where the marble chips are exposed to the weather or become wetted with water. There has accordingly arisen a demand for the use of safety aggregate floors in various public places, such as stairs, platforms and the halls and lobbies of public buildings.

It is accordingly an object of our invention to provide an anti-slipping terrazzo cement tile which has a dense and strong structure and a finished surface and in which the exposed faces of the chips are closely spaced and receive substantially all of the wear.

It is a further object of our invention to provide a terrazzo cement tile of low porosity which contains anti-slipping, wear-resisting abrasive chips embedded therein to prevent a pedestrian slipping and in which the abrasive chips may be interspersed with stone chips to form pleasing color schemes and attractive architectural designs.

A still further object is to provide a simple and economical method of making such a tile and of providing a dense and strong body of cement bonded terrazzo chips and finishing the tops of the exposed chips to form a smooth and polished tread surface.

With these and other objects as will be apparent in the following disclosure, our invention resides in the steps of a process and the structural composition of a tile as described in the specification and covered by the claims appended hereto.

In accordance with our invention we may make a terrazzo tile which has a surface containing stone porcelain chips, including marble, porcelain and the like interspersed with an anti-slipping aggregate, such as chips of bonded abrasive grains. We prefer to employ chips of ceramic-bonded abrasive material, such as described in the patent to Jeppson No. 1,371,683 of March 15, 1921, and in order to provide a pleasing and artistic floor surfacing, we may intersperse these anti-slipping, wear-resisting abrasive chips with marble chips of various colors and if desired, we may arrange them in a definite pattern or employ therewith small stone or abrasive blocks of a uniform size and shape which are laid in a definite arrangement.

Referring to the drawings, we have there illustrated diagrammatically the various steps involved in carrying out one method of our invention and a tile made thereby, in which—

Figure 1 represents the step of washing the chips;

Fig. 2 shows the mixing operation;

Fig. 3 shows the mixed mass being jolted in a mold;

Fig. 4 shows the step of pressing a backing thereon;

Fig. 5 shows the tile, at this stage in its manufacture;

Fig. 6 represents the step of rubbing the tread surface;

Figs. 7 and 8 show the two polishing operations, the first with a grinding wheel and the other with a felt wheel and chemicals; and Fig. 9 shows a completed tile.

If, for example, it is desired to make a tile containing a pattern of blocks, surrounded by a terrazzo of suitably crushed and graded marble and anti-slipping aggregates of irregular form, such as illustrated in Fig. 9, we may proceed as follows:

The desired proportions of marble chips and anti-slipping aggregates of ceramic bonded crystalline alumina grains are weighed out and mixed together. We may use, for example, a mixture of one-third aggregates and two-thirds marble, by weight, for one type of tile. They are washed with clean water in order to remove surface dirt and particularly to fill the pores of the porous material with water, so that when latter mixed with cement the plastic material will not impregnate the pores. By this procedure we insure that when the material is afterwards bonded with cement and the surface is cleaned, the cement which adheres to the top exposed surface of a porous chip will be easily removed, leaving the aggregate material with open pores.

The washing operation may be carried out in various ways, but we have illustrated it in Fig. 1 as comprising the steps of placing the material 10 in a woven wire basket 11 and immersing the same in a tub 12 of running water.

These materials, which have been wetted, are then mixed thoroughly in a mixing machine, such as illustrated in Fig. 2, which comprises power driven paddles 15 rotated in a round bottomed, open tub 16. Dry Portland cement, in a desired quantity, such as 50% by weight, is thereafter added to the mixture. When the aggregate chips and cement have been mixed, water is added to bring the mass to the desired consistency and moldability for the subsequent operations. It will of course be understood that the proportions of these materials are well within the knowledge of those skilled in the art may be varied widely.

We have found, in the course of our experimentation, that if these anti-slipping and marble chips are bonded in cement, in accordance with the usual practice, that the body thus formed is not sufficiently dense and strong and that it does not provide a pleasing appearance such as is required for artistic effects. Moreover, the chips, if thrown loosely into a mold and then covered with a cement mixture, do not form a proper anti-slipping surface since an insufficient amount of the abrasive chips form the surface of the tread. Due to the irregular shapes of these bodies, only the points, edges and small projecting portions of the chips may be presented on the upper surface of the tread, thus leaving large areas of the cement exposed to unnecessary wear.

We have found that it is desirable to have the chips form the major portion of the surface and to receive substantially all of the traffic wear. Hence, we propose to so arrange and treat the chips that broad surfaces thereof will be exposed on the tread surface and to make them compact and adhere closely and firmly to the cement.

In order to accomplish this purpose, we perferably jolt the chips and cement in a mold and thereby insure a dense packing of the mass. We prefer that the initial settling of the chips be accomplished without pressure, since any large amount of pressure, such as is used in the press method of shaping plastic articles, would tend to break off the corners and the sharp portions of the chips and crush them to smaller sizes, thereby rendering them less effective for the desired purpose. In accordance with our experimentation, we have found that it is desirable to shape the article in two separate stages, one to form the tread layer and the other to apply a backing thereto. The first stage comprises placing the facing mixture in a metal mold and then jolting it on a suitable jolting machine until this tread layer has been sufficiently settled and compacted.

The machine for this purpose may be suitably constructed. As illustrated, it may comprise a table 18 which is reciprocable vertically by means of a plunger 19 lifted periodically by a rotated cam 20. The table 18, at each downward movement, strikes sharply against a fixed member 21 and jars the material in the mold 22. This mold may be of desired construction, and usually comprises an iron frame 23 forming the sides of a multiple mold which are separable from a bottom 24 so that the tiles may be easily removed therefrom. The mold bottom, which may be of desired configuration, forms the tread surface of the tile.

If it is desired to form a pattern, chips or blocks 25 may be suitably placed in the bottom of the mold and the concrete and chip mixture poured over them. We prefer that the terrazzo facing layer of chips and cement constitute one-half of the thickness of the tile; hence a considerably thicker layer of the plastic mixture is placed in the mold so that it may settle to the desired thickness. The material is levelled off roughly in the mold and the jolting operation is then carried on for a short time, until the mass has been compacted to the desired extent.

Thereafter, we provide a backing layer which is adapted to form the body of the tile or to strengthen the facing layer. As a specific illustration of one backing composition, we may employ a mixture of one part Portland cement to two parts of sand. These materials may be mixed dry in a machine such as shown in Fig. 2, after which water is added to obtain the usual plasticity as required for a cement flooring. This backing material is placed in the mold on top of the jolted facing and the whole mass is again jolted in order to smooth down the backing and cause it to adhere firmly to the facing. This jolted mass is then set away in its mold for 24 hours or more to harden and is supplied with water as may be needed at this stage. When sufficiently hard for handling, it is removed from the mold for subsequent operations.

If it is desired to utilize the jolting molds more frequently, we may press the backing onto the terrazzo facing by hydraulic pressure. This is feasible after the chips have been settled into position and merely require being compacted into a dense mass. At this stage, heavy pressure will not crush the chips as it would if applied thereto initially. The backing composition may consist of a fairly dry mixture of cement and sand, as is well known in the art, i. e., it is wetted only sufficiently to make it hold together after being subjected to pressure. In this case, the tile may be removed from the mold without delay and set away to harden, thus saving the expense involved in tying up a large equipment of molds during the hardening operation.

For this pressing operation we may employ any suitable form of press, operated by power or by hand, such as the type shown in Fig. 4 which comprises a base 30, arranged to support the mold 22, and a platen 31 shaped to enter the open upper end of the mold and squeeze the materials together. The platen is operated by the usual screw 32 and hand wheel 33 supported by the framework 34 as is well known.

As the result of either method of affixing the backing to the facing, we obtain a tile such is shown in Fig. 5, in which the area of the chips 36, which are visible on the tread surface, does not form the major portion of the whole surface. Cement is exposed to a large degree, and if the tile were used in this condition, it would wear away and dust easily and not form a satisfactory flooring.

After the tile has been removed from the mold, it may be further hardened by immersion in water for several days and then dried. It is thereafter treated by a grinding operation which removes a considerable thickness of the surface layer and leaves closely spaced plane chip faces exposed to view throughout the major portion of the tread area. To this end, we preferably employ a rubbing bed such as is diagrammatically illustrated in Fig. 6, which comprises a rotary iron plate 38 carrying a coating of abrasive grains and water on which the tile is held. The tiles may have their edges ground and are then placed face down on this plate and held stationary so that the abrasive grain carried on the plate cuts and grinds away the exterior surface thereof. This operation smoothes down the face of the tile and removes the top cement layer from the chips and leaves the bright faces of the marble and the clean faces of the aggregates exposed for a tread surface. After rubbing the mass for from five to twenty minutes, as determined largely by the type of materials used, the tile is then examined and if found necessary, any small air holes or pores in the top surface formed during the previous operation are filled in with a neat cement which has been prepared of the proper consistency and color scheme to match the tile body as may be desired.

The tile is then permitted to harden for from 24 to 48 hours, it being understood that during these various operations the tile is kept slightly moistened in order to aid the hardening operation. It is thereafter finished on the rubbing bed with a finer abrasive grain which serves to clean the surfaces of the chips and give the marble a substantially smooth polish, or the tile may be polished by means of a fine grained grinding wheel, preferably made of ceramic bonded silicon carbide abrasive, as shown in Fig. 7. This wheel 40 may be rotated by suitable means and preferably with its disk face in contact with the tile. If the tile chips, and particularly if marble is used, need polishing we may do this in a subsequent operation by means of a suitable rotatable felt wheel 42, as illustrated in Fig. 8. With this wheel we may employ oxalic acid crystals with a slight amount of water or other suitable chemicals. If desired, a wax may be employed to finish the surface. This gives the marble a bright, clean appearance, but does not particularly affect the looks of the abrasive chips. The tile is now complete and it is again set away in a damp atmosphere to harden, after which it is then ready for use.

If the body being made is of a large size, as is required for flooring slabs, a reinforcement, such as a screen of wire or metal rods, may be placed on top of the jolted terrazzo mixture before the backing of cement is added thereto. This insures a firm union between the reinforcement and the tile body.

The finished tile, as shown in Fig. 9, comprises a two layer body, the top layer 44 consisting mainly of a mixture of chips 25 and 36 of stone and ceramic bonded crystalline alumina grains in substantially the maximum contiguity and compactness, and grouted or bonded by means of cement into a dense structure. These chips have plane top faces and irregularly shaped under portions which unite firmly with the bonding cement. The lower layer 45 consists of a suitable cement or concrete backing of cheap material which strengthens and supports the facing layer. The tile has a very low porosity or water absorption capacity and thus is particularly serviceable where exposed to weather and moisture. It of course will be understood that the term "cement" is used broadly to cover the usual range of equivalents.

This method is particularly advantageous due to the cooperation between the steps of jolting and grinding, since the latter operation is greatly reduced in expense and time by the previous step which causes the chips to be arranged with flat faces against the mold bottom. This means that to get a given area of chip faces, it is not necessary to grind the hard chips in a jolted tile for as long a time as would be required with a tile made in a press or by ordinary methods. We moreover obtain a tile which is stronger than tiles which have been otherwise produced, thus making it feasible to utilize a thinner tile for the same structural stresses and strains or to produce a particularly strong body where building requirements call for the same.

The term jolting, as used throughout this specification and the appended claims, means reciprocating the mold, or the mixture of ingredients of the composition, in an up and down direction during which the mold is maintained in a substantially upright position to jolt or jar the mold so as to distribute the chips in a substantially uniform manner over the bottom of the mold.

Having thus described our invention, what we claim as new and desire to secure by Letters Patent, is:

1. The method of making a terrazzo tile comprising the steps of wetting porous chips of bonded abrasive grains with water, mixing them with dry cement, and thereafter developing a desired moldability therein, shaping a tile therefrom and grinding off a layer from the tile to provide plane faces on the exposed chips.

2. The method of making a terrazzo tile comprising the steps of mixing terrazzo chips of bonded abrasive grains with water, adding dry cement thereto and forming a moldable mass therefrom, jolting the mixture in a mold to form a tread layer, placing a cement backing thereon, pressing the backing and facing layers together, permitting the tile to harden, and thereafter grinding the tread layer to present exposed plane chip faces which form the major portion of the tile surface.

3. The method of making a terrazzo tile comprising the steps of wetting porous abrasive aggregates and stone chips with water, mixing dry cement therewith, adding water to develop moldability therein, jolting the mixture in a mold to provide a compact surface layer, permitting the tile to harden and subsequently grinding said layer to provide a tread surface having plane chip faces closely spaced and surrounded by cement.

4. A terrazzo tile comprising a dense body of low porosity having irregularly shaped chips of stone and abrasive aggregates arranged in substantially the maximum contiguity and compactness and bonded with cement, the exposed faces of said chips being plane and closely positioned and forming such a portion of the tread surface as to receive substantially all of the traffic wear.

5. A terrazzo tile comprising a cement body having a facing layer of chips of stone and abrasive aggregates embedded in cement as a dense, compact, structurally strong mass in which the chips are in close contact and occupy the major portion of the tread area of said layer, said chips having plane faces which have been ground and polished and the chips and the cement exposed therebetween having a low water absorptive capacity.

Signed at Worcester, Massachusetts, this 12th day of June, 1923.

GEORGE N. JEPPSON.
CARL L. LEAFE.

grouted or bonded by means of cement into a dense structure. These chips have plane top faces and irregularly shaped under portions which unite firmly with the bonding cement. The lower layer 45 consists of a suitable cement or concrete backing of cheap material which strengthens and supports the facing layer. The tile has a very low porosity or water absorption capacity and thus is particularly serviceable where exposed to weather and moisture. It of course will be understood that the term "cement" is used broadly to cover the usual range of equivalents.

This method is particularly advantageous due to the cooperation between the steps of jolting and grinding, since the latter operation is greatly reduced in expense and time by the previous step which causes the chips to be arranged with flat faces against the mold bottom. This means that to get a given area of chip faces, it is not necessary to grind the hard chips in a jolted tile for as long a time as would be required with a tile made in a press or by ordinary methods. We moreover obtain a tile which is stronger than tiles which have been otherwise produced, thus making it feasible to utilize a thinner tile for the same structural stresses and strains or to produce a particularly strong body where building requirements call for the same.

The term jolting, as used throughout this specification and the appended claims, means reciprocating the mold, or the mixture of ingredients of the composition, in an up and down direction during which the mold is maintained in a substantially upright position to jolt or jar the mold so as to distribute the chips in a substantially uniform manner over the bottom of the mold.

Having thus described our invention, what we claim as new and desire to secure by Letters Patent, is:

1. The method of making a terrazzo tile comprising the steps of wetting porous chips of bonded abrasive grains with water, mixing them with dry cement, and thereafter developing a desired moldability therein, shaping a tile therefrom and grinding off a layer from the tile to provide plane faces on the exposed chips.

2. The method of making a terrazzo tile comprising the steps of mixing terrazzo chips of bonded abrasive grains with water, adding dry cement thereto and forming a moldable mass therefrom, jolting the mixture in a mold to form a tread layer, placing a cement backing thereon, pressing the backing and facing layers together, permitting the tile to harden, and thereafter grinding the tread layer to present exposed plane chip faces which form the major portion of the tile surface.

3. The method of making a terrazzo tile comprising the steps of wetting porous abrasive aggregates and stone chips with water, mixing dry cement therewith, adding water to develop moldability therein, jolting the mixture in a mold to provide a compact surface layer, permitting the tile to harden and subsequently grinding said layer to provide a tread surface having plane chip faces closely spaced and surrounded by cement.

4. A terrazzo tile comprising a dense body of low porosity having irregularly shaped chips of stone and abrasive aggregates arranged in substantially the maximum contiguity and compactness and bonded with cement, the exposed faces of said chips being plane and closely positioned and forming such a portion of the tread surface as to receive substantially all of the traffic wear.

5. A terrazzo tile comprising a cement body having a facing layer of chips of stone and abrasive aggregates embedded in cement as a dense, compact, structurally strong mass in which the chips are in close contact and occupy the major portion of the tread area of said layer, said chips having plane faces which have been ground and polished and the chips and the cement exposed therebetween having a low water absorptive capacity.

Signed at Worcester, Massachusetts, this 12th day of June, 1923.

GEORGE N. JEPPSON.
CARL L. LEAFE.

---

Certificate of Correction.

Patent No. 1,619,734. Granted March 1, 1927, to

GEORGE N. JEPPSON ET AL.

It is hereby certified that error appears in the printed specification of the above-numbered patent requiring correction as follows: Page 1, line 75, strike out the word "porcelain"; page 2, line 49, after the word "art" insert the word *and;* and that the said Letters Patent should be read with these corrections therein that the same may conform to the record of the case in the Patent Office.

Signed and sealed this 29th day of March, A. D. 1927.

[SEAL.]

M. J. MOORE,
*Acting Commissioner of Patents.*

Certificate of Correction.

Patent No. 1,619,734. Granted March 1, 1927, to

GEORGE N. JEPPSON ET AL.

It is hereby certified that error appears in the printed specification of the above-numbered patent requiring correction as follows: Page 1, line 75, strike out the word " porcelain "; page 2, line 49, after the word " art " insert the word *and;* and that the said Letters Patent should be read with these corrections therein that the same may conform to the record of the case in the Patent Office.

Signed and sealed this 29th day of March, A. D. 1927.

[SEAL.]

M. J. MOORE,
*Acting Commissioner of Patents.*